(12) United States Patent  
Brauer et al.

(10) Patent No.: US 9,003,976 B2  
(45) Date of Patent: Apr. 14, 2015

(54) ELECTRIC MACHINE, RAIL VEHICLE AND RAIL-MOUNTED CAR SET

(75) Inventors: Michael Brauer, Möhrendorf (DE); Carsten Probol, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/996,966

(22) PCT Filed: Dec. 12, 2011

(86) PCT No.: PCT/EP2011/072465  
§ 371 (c)(1),  
(2), (4) Date: Jun. 21, 2013

(87) PCT Pub. No.: WO2012/084576  
PCT Pub. Date: Jun. 28, 2012

(65) Prior Publication Data  
US 2013/0270822 A1  Oct. 17, 2013

(30) Foreign Application Priority Data  
Dec. 23, 2010 (DE) .................. 10 2010 064 016

(51) Int. Cl.  
*B61C 3/00* (2006.01)  
*H02K 11/00* (2006.01)  
*H02K 11/02* (2006.01)  
*B60L 9/00* (2006.01)

(52) U.S. Cl.  
CPC .......... *H02K 11/0089* (2013.01); *H02K 11/028* (2013.01); *B60L 9/005* (2013.01); *B60L 2200/26* (2013.01)

(58) Field of Classification Search  
USPC ............... 105/49, 60, 96, 34.1; 361/220, 212, 361/221, 33; 318/434; 324/525  
See application file for complete search history.

(56) References Cited  
U.S. PATENT DOCUMENTS

| 491,857 | A | * | 2/1893 | Rae | 105/60 |
| 2,371,621 | A | * | 3/1945 | Harwick | 105/133 |
| 4,831,295 | A | * | 5/1989 | Posedel | 310/72 |

(Continued)

FOREIGN PATENT DOCUMENTS

| DE | 35 11 755 A1 | 10/1985 |
| DE | 200 07 714 U1 | 9/2001 |

(Continued)

OTHER PUBLICATIONS

ICE—Zug der Zukunft (ICE Train of the Future) Publishers: Dr.-Ing. E.h. Wolfram O. Martinsen & Professor Dipl.-Ing. Dipl.-Wirtsch.-Ing. Theo Rahn Editing: Dipt-Ing. Hans Herrmann, Professor Dr.-Ing. Hubert Hochbruck, Dipl.-Ing. Heinz R. Kurz vol. 3, 1997, pp. 147-171; 1997.

*Primary Examiner* — Jason C Smith  
(74) *Attorney, Agent, or Firm* — Henry M. Feiereisen LLC

(57) ABSTRACT

An electric machine has a base body in which a stator of the electric machine is arranged. The electric machine has a rotor shaft which is mounted in the base body in bearings for rotation. The electric machine has a pick-up element connected in fixed rotative engagement with the base body and which taps a voltage present on the rotor shaft. The pick-up element is electrically connected to the base body via a capacitor and/or an ohmic resistor. A capacitance value of the capacitor is at least 1 nF. A resistance value of the ohmic resistor is between 10 mO and 10 O.

8 Claims, 3 Drawing Sheets

(56) References Cited

U.S. PATENT DOCUMENTS

| | | | |
|---|---|---|---|
| 4,913,060 A * | 4/1990 | Sekine et al. | 105/96 |
| 5,006,769 A * | 4/1991 | Posedel | 318/434 |
| 6,714,020 B2 * | 3/2004 | Hobelsberger et al. | 324/525 |
| 7,102,379 B2 * | 9/2006 | Hobelsberger et al. | 324/765.01 |
| 7,117,744 B2 * | 10/2006 | Hobelsberger et al. | 73/660 |
| 7,193,836 B2 * | 3/2007 | Oh et al. | 361/220 |
| 7,608,950 B2 * | 10/2009 | Brauer | 310/68 R |
| 7,649,470 B2 * | 1/2010 | Hobelsberger et al. | 340/679 |
| 8,396,677 B2 * | 3/2013 | Hobelsberger et al. | 702/58 |
| 8,536,839 B2 * | 9/2013 | Hobelsberger et al. | 322/99 |
| 8,680,728 B2 * | 3/2014 | Errera et al. | 310/86 |
| 2003/0020482 A1 * | 1/2003 | Hobelsberger et al. | 324/525 |
| 2011/0067596 A1 * | 3/2011 | Jockel | 105/34.1 |
| 2012/0105235 A1 | 5/2012 | Dietrich et al. | |
| 2013/0270822 A1 * | 10/2013 | Brauer et al. | 290/3 |

FOREIGN PATENT DOCUMENTS

| | | |
|---|---|---|
| DE | 10 2007 019 828 B3 | 10/2008 |
| EP | 0 271 678 A1 | 6/1988 |
| EP | 0 391 181 A2 | 10/1990 |
| EP | 1 280 249 A1 | 1/2003 |

\* cited by examiner

C = 1nF ... 5nF ... 10nF ...
R = 10mΩ ... 20mΩ ... 50mΩ ... 100mΩ ... 1Ω ... 10Ω ...

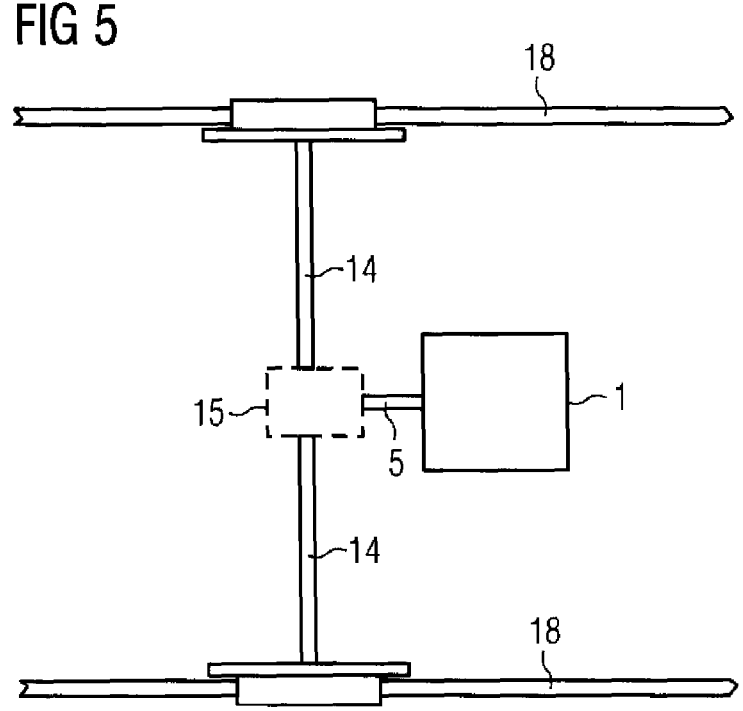
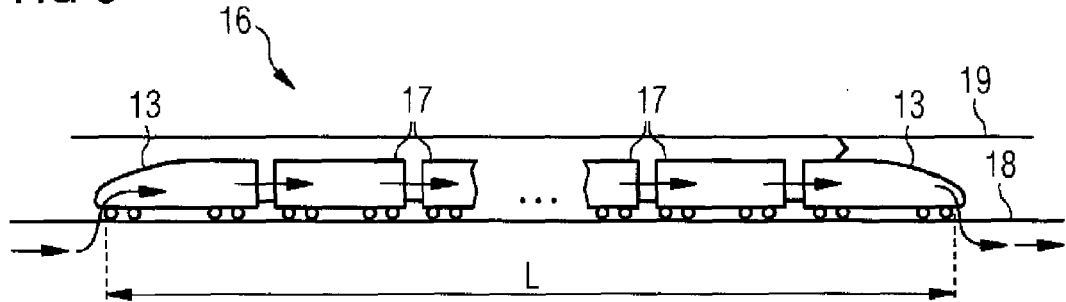

ELECTRIC MACHINE, RAIL VEHICLE AND RAIL-MOUNTED CAR SET

CROSS-REFERENCES TO RELATED APPLICATIONS

This application is the U.S. National Stage of International Application No. PCT/EP2011/072465, filed Dec. 12, 2011, which designated the United States and has been published as International Publication No. WO 2012/084576 A2 and which claims the priority of German Patent Application, Serial No. 10 2010 064 016.6, filed Dec. 23, 2010, pursuant to 35 U.S.C. 119(a)-(d).

BACKGROUND OF THE INVENTION

The present invention relates to an electric machine,
wherein the electric machine has a base body in which a stator of the electric machine is arranged,
wherein the electric machine has a rotor shaft which is rotatably mounted in the base body by way of bearings,
wherein the electric machine has a pick-up element which is connected to the base body in a mechanically rotationally fixed manner and which taps a voltage occurring in the rotor shaft.

The present invention furthermore relates to a rail vehicle,
wherein the rail vehicle has at least one wheel axle and at least one electric machine,
wherein the at least one wheel axle is connected to a rotor shaft of the at least one electric machine directly or by way of a gear train assembly.

The present invention further relates to a rail-mounted car set which has a sequence of rail vehicles coupled to one another.

The above-cited subject matters are generally known. With regard to the electric machine, reference is made purely by way of example to DE 10 2007 019 828 B3 and U.S. Pat. No. 7 193 836 B2.

In electric motors, shaft voltages can occur in the rotor shaft, thereby inducing bearing currents. The bearing currents are essentially undesirable, but not really disruptive in every case. The most serious type of bearing currents are what are referred to as EDM bearing currents (EDM=electric discharge machining), because bearing currents of said type very quickly lead to bearing damage. With bearing currents of said type an electric arc is produced between the rollers and the race of the bearings. As a result thereof the lubricating grease burns and craters are produced in the bearing shells.

In addition to EDM bearing currents, capacitive bearing currents, conventional shaft voltages, high-frequency circular current and capacitive rotor ground currents can also occur.

In order to eliminate and suppress bearing currents it is known in the prior art to provide the electric machine with a pick-up element which is connected to the base body in a mechanically rotationally fixed manner and which taps a voltage occurring in the rotor shaft. The prior art cited in the introduction reveals embodiments of said type.

However, this approach is problematic, in particular in the case of rail vehicles. The reason for this is that the pick-up element causes an electrically conductive connection to exist from the rail by way of the wheel axle and possibly a gear train assembly to the motor housing. The connection can exhibit a very low impedance. As a result it can happen that a considerable amount of an operating current which is injected by another rail vehicle (in particular a rail vehicle of a different train) as a return current into the rail flows through the rail vehicle. This can cause interference to the communications equipment on the rail vehicle or the vehicle grounding system, in particular the shield of data lines, can be overloaded. This danger is present especially in the case of long vehicles having car bodies made of aluminum, since as a result the vehicle makes such a large conducting cross-section available that the specific resistance per meter of car length is less than the specific resistance per meter of rail. For this reason tapping devices of the above-cited type are not used in rail vehicles in most cases.

SUMMARY OF THE INVENTION

The object of the present invention is to provide an electric machine, a rail vehicle and a rail-mounted car set in which not only bearing currents but also traction reverse currents are avoided at least to a considerable extent.

According to one aspect of the invention, an electric machine of the type cited in the introduction includes a pick-up element electrically connected to the base body by way of a capacitor having a capacitance value of at least 1 nF. Preferably the capacitance value amounts even to at least 5 nF, in particular at least 10 nF.

According to another aspect of the invention, an electric machine of the type cited in the introduction includes a pick-up element electrically connected to the base body by way of an ohmic resistor having a resistance value lying between 10 mO and 10 O. In this case the resistance value can lie for example between 20 mO and 1 O, in particular between 50 mO and 100 mO.

The capacitance and resistance values cited above are referred to normal conditions, which is to say a temperature of 20° C. and normal barometric pressure (1013 hectopascals).

In a preferred embodiment the ohmic resistor can be implemented as a PTC thermistor. What is achieved thereby in particular is that at high currents which heat up the resistor its resistance increases, with the result that it opposes a further current flow with a greater resistance.

It is possible for the capacitor and the ohmic resistor to be connected in parallel with each other. Alternatively, however, it is sufficient for only the resistor or only the capacitor to be present.

According to another aspect of the invention, a rail vehicle includes at least one electric machine having a base body, a stator arranged in the base body, a rotor shaft which is rotatably mounted in the base body by way of bearings, and a pick-up element mechanically connected to the base body and prevented from rotating relative to the base body. The pick-up element taps a voltage occurring in the rotor shaft and is electrically connected to the base body by way of an ohmic resistor having a resistance value in a range between 10 mO and 10 O, or a capacitor having a capacitance value of at least 1 nF, or a parallel circuit formed from the ohmic resistor and the capacitor. At least one wheel axle connected to the rotor shaft directly or by way of a gear train assembly.

According to yet another aspect of the invention, at least the first and the last rail vehicle of a sequence of rail vehicles coupled to one another-include one of the aforedescribed rail vehicles.

BRIEF DESCRIPTION OF THE DRAWING

Further advantages and details will emerge from the following description of exemplary embodiments taken in conjunction with the schematic drawings, in which.

DETAILED DESCRIPTION OF PREFERRED EMBODIMENTS

Figure 1:
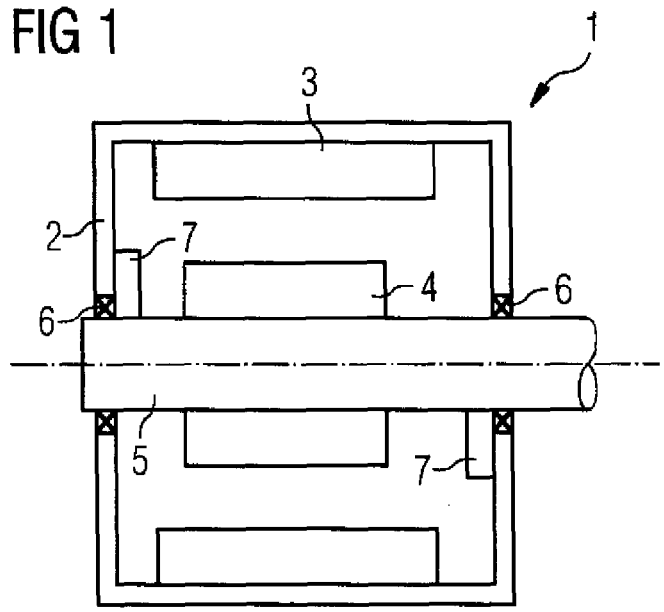
FIG. 1 schematically shows an electric machine,
FIG. 2 schematically shows a detail of FIG. 1 in terms of circuit layout, FIG. 3 schematically shows a detail of FIG. 1 in terms of mechanical design, FIG. 4 schematically shows a rail vehicle, FIG. 5 schematically shows a part of the rail vehicle of FIG. 4, and FIG. 6 schematically shows a rail-mounted car set.

According to FIG. 1, an electric machine 1 has a base body 2. A stator 3 of the electric machine 1 is arranged in the base body 2. The electric machine 1 also has a rotor 4. During operation of the electric machine 1 the rotor 4 electrically interacts with the stator 3. The rotor 4 is arranged on a rotor shaft 5 of the electric machine 1 which is rotatably mounted in the base body 2 by way of bearings 6.

Shaft voltages can occur in the rotor shaft 5 during operation of the electric machine 1. Without further measures the shaft voltages would induce currents which flow by way of the bearings 6 of the electric machine 1. Bearing currents of said type can relatively quickly lead to bearing damage. In order to avoid or at least reduce such currents, the electric machine 1 therefore has (at least) one protective circuit 7 which will be explained in more detail hereinbelow in conjunction with FIG. 2. The protective circuit 7 and with it the below-explained elements of the protective circuit 7 are connected to the base body 2 in a mechanically rotationally fixed manner.

Figure 2:
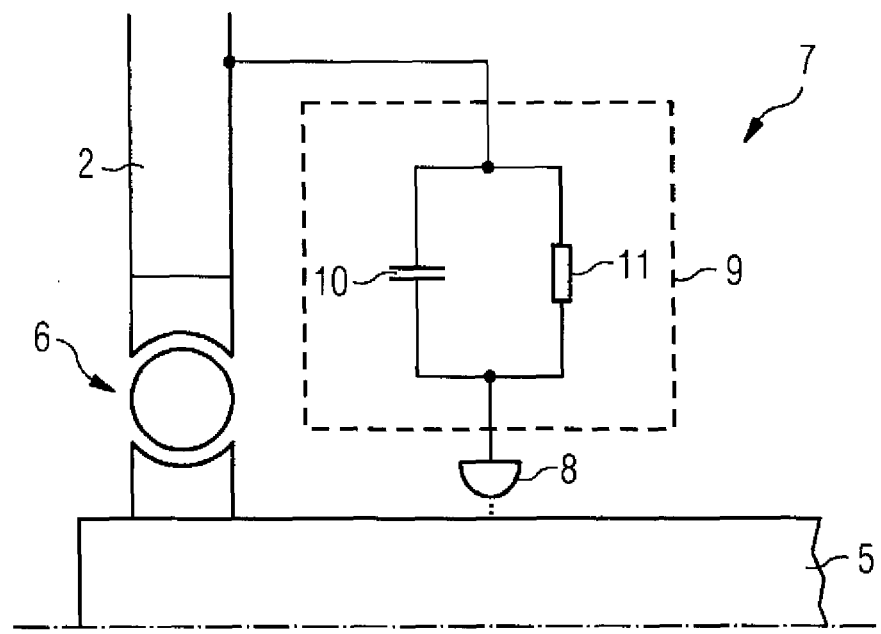

According to FIG. 2, the protective circuit 7 has a pick-up element 8. The pick-up element 8 taps the voltages occurring in the rotor shaft 5. Starting from the pick-up element 8, a current accordingly flows onto the base body 2. Referred to the current flow, the pick-up element 8 is that element which directly taps the voltage present in the rotor shaft 5 (or an intermediate element arranged in a rotationally fixed manner on the rotor shaft 5, for example a slip ring). Referred to the current flow from the rotor shaft 5 to the base body 2, the pick-up element 8 is therefore the element "nearest to the front" of the protective circuit 7.

According to FIG. 2, the pick-up element 8 is not directly connected to the base body 2 electrically, but is connected by way of an impedance 9. According to FIG. 2, the impedance 9 has a capacitor 10 and an ohmic resistor 11, the capacitor 10 and the ohmic resistor 11 being connected in parallel with each other. Alternatively, only the capacitor 10 could be present, i.e. the ohmic resistor 11 could be omitted. Equally alternatively, only the ohmic resistor 11 could be present, i.e. the capacitor 10 could be omitted.

If only the capacitor 10 is present, a capacitance value C of the capacitor 10 should be equal to at least 1 nF. Preferably the capacitance value C is even at least 5 nF, in particular at least 10 nF.

If only the ohmic resistor 11 is present, a resistance value R of the ohmic resistance 11 should lie between 10 mΩ and 10Ω. Preferably the resistance value R is between 20 mΩ and 1Ω. In particular it can lie between 50 mΩ and 100 mΩ.

The statements cited in respect of the capacitance value C and the resistance value R relate to normal conditions (20° C., normal barometric pressure).

If both the capacitor 10 and the ohmic resistor 11 are present, it is sufficient if one of the above-cited conditions is met, i.e. either the capacitance value C equals at least 1 nF or the resistance value R lies between 10 mΩ and 10Ω. The other condition in each case may be violated. On the other hand the resistance value R must not be too small. In other words it must not be below 10 mΩ. It is however preferred that both conditions are satisfied, i.e. that both the capacitance value C is equal to at least 1 nF and the resistance value R lies between 10 mΩ and 10Ω.

It is possible for the resistance value R of the ohmic resistor 11 to be (substantially) independent of the temperature. Preferably, however, the ohmic resistor 11 is embodied as a PTC resistor, i.e. as a PTC thermistor.

Figure 3:
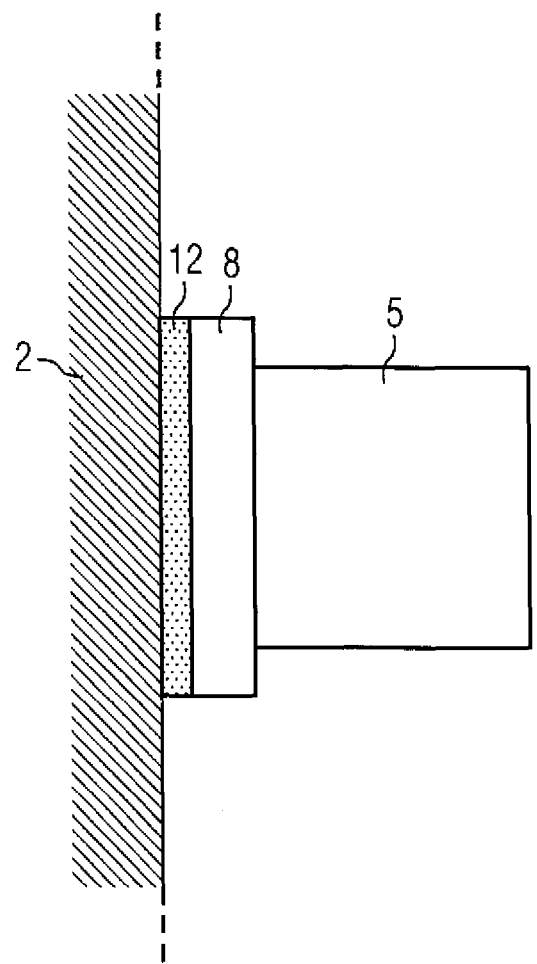

According to FIG. 3, a so-called SGR (=shaft grounding ring), as known for example from U.S. Pat. No. 7,193,836 B2, can be used for example as pick-up element 8 in order to achieve the above-cited capacitance and resistance values C, R. In the prior art the shaft grounding ring is secured to the base body 2 for example by means of an electrically highly conductive epoxy resin. In the present invention, in contrast thereto, it is possible for example, as shown in FIG. 3, to secure the element by means of a suitable adhesive 12 which alternatively has only a limited electrical conductivity or has an electrically insulating effect. Electrically insulating adhesives are generally known.

The electrical conductivity and the dielectric constant of the adhesive 12 can if necessary by adjusted by means of a selective dosing of the concentration of conductive particles in the adhesive 12. An electrical insulation can also be achieved for example by arranging an electrically insulating element, for example a corresponding foil, between the shaft grounding ring and the base body 2. The shaft grounding ring can also be coated, for example anodized, in an electrically insulating manner in the contact region to the base body 2. Other embodiments are also possible.

In the case of the use of an adhesive 12 having limited electrical conductivity, the capacitor 10 and the ohmic resistor are realized as distributed elements. Alternatively, discrete components, in particular implemented in SMD technology (SMD=surface-mounted device), can be used.

What is achieved as a result of the inventive embodiment of the electric machine 1 is that transient shaft voltages occurring during the operation of the electric machine 1 are quickly dissipated. The impedance 9 between the pick-up element 8 and the base body 2 is harmless in this regard.

Figure 4:
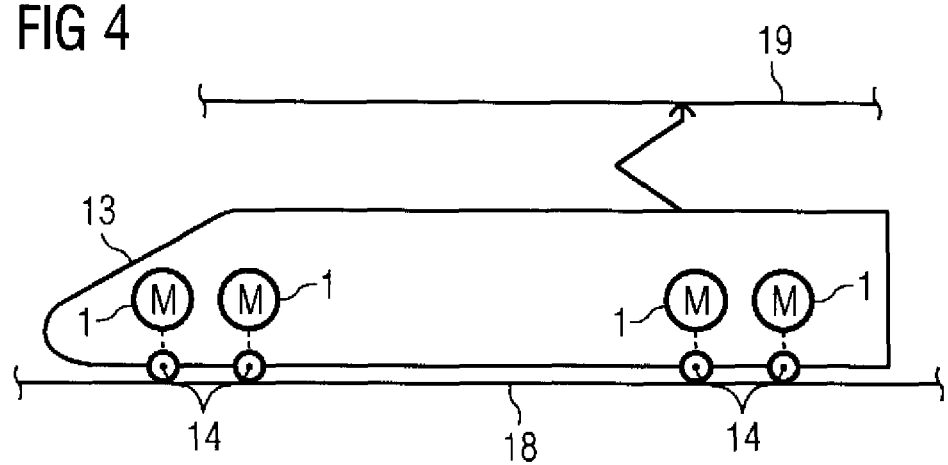

The inventive electric machine 1—i.e. including the above-described protective circuit 7—can be used for example according to FIGS. 4 and 5 as a drive motor M (or possibly as one of a plurality of drive motors M) of a rail vehicle 13. According to FIGS. 4 and 5, the rail vehicle 13 in this case has a wheel axle 14 in addition to the electric machine 1. The wheel axle 14 can be a single wheel axle. Often, however, it is a wheelset axle 14.

When used in a rail vehicle 13, the wheel axle 14 is connected to the rotor shaft 5 of the electric machine 1 according to the invention. It is possible for the connection to be implemented directly. Alternatively, an indirect connection can be established by way of an intermediate gear train assembly 15. Because the gear train assembly 15 is consequently only optionally present, it is represented only by a dashed outline in FIG. 5.

According to FIG. 6, the rail vehicle 13 can be part of a rail-mounted car set 16. According to FIG. 6, the rail-mounted car set 16 consists of a sequence of rail vehicles 13, 17 coupled to one another. According to the invention, at least the first and the last rail vehicle of the sequence of rail vehicles 13, 17 coupled to one another are embodied according to the invention.

In railroad systems the return flow of the operating current drawn from the overhead catenary 19 often passes by way of the rails 18. The operating current can attain considerable values, sometimes exceeding 1000 amperes. The specific resistance of the rails 18 typically lies in the range of approx.

30 µΩ per meter of rail 18. Given an overall length L of the rail-mounted car set 16 of approx. 300 meters—a realistic value—the total resistance occurring along the rails 18 over the overall length amounts to around 9 mΩ. If the first and the last rail vehicle 13 of the rail-mounted car set 16 were in fact to have a tapping device 8, though the tapping device 8 were to be connected directly to the base body 2 without the impedance 9 being connected therebetween, a typical resistance value of the rail-mounted car set 16, measured from the first to the last rail vehicle 13 of the rail-mounted car set 16 (more precisely: from the first wheel axle 14 of the first rail vehicle 13 to the last wheel axle 14 of the last rail vehicle), would typically lie in the range below 10 mΩ, for example at around 5 mΩ. In this case therefore, as indicated by corresponding arrows in FIG. 6, a considerable part of the reverse operating current would flow through the rail-mounted car set 16. If, on the other hand, the first and the last rail vehicle 13 of the rail-mounted car set 16 are embodied according to the invention, only a small part of the reverse operating current will still flow through the rail-mounted car set 16, for example less than 10% of the reverse operating current. If an exclusively capacitive connection exists (i.e. the ohmic resistor 11 is omitted or becomes sufficiently large), virtually no proportion of the reverse operating current will flow through the rail-mounted car set 16. This notwithstanding, the motor-internal shaft voltages will be dissipated quickly and reliably.

The above description serves solely to explain the present invention. In contrast, the scope of protection of the present invention shall be determined exclusively by the attached claims.

The invention claimed is:

1. An electric machine, comprising:
   a base body,
   a stator arranged in the base body,
   a rotor shaft which is rotatably mounted in the base body by way of bearings, and
   a pick-up element mechanically connected to the base body and prevented from rotating relative to the base body, wherein the pick-up element taps a voltage occurring in the rotor shaft and is electrically connected to the base body by way of an ohmic resistor embodied as a positive-temperature-coefficient (PTC) thermistor and having a resistance value in a range between 10 mΩ and 10 Ω.

2. The electric machine of claim 1, wherein the resistance value is in a range between 20 mΩ and 1 Ω.

3. The electric machine of claim 1, wherein the resistance value is in a range between 50 mΩ and 100 mΩ.

4. The electric machine of claim 1, wherein the pick-up element is electrically connected to the base body by way of an additional capacitor connected in parallel with the resistor and having a capacitance value of at least 1 nF.

5. The electric machine of claim 4, wherein the capacitance value is at least 5 nF.

6. The electric machine of claim 4, wherein the capacitance value is at least 10 nF.

7. A rail vehicle, comprising:
   at least one electric machine comprising a base body, a stator arranged in the base body, a rotor shaft which is rotatably mounted in the base body by way of bearings, and a pick-up element mechanically connected to the base body and prevented from rotating relative to the base body, wherein the pick-up element taps a voltage occurring in the rotor shaft and is electrically connected to the base body by way of an ohmic resistor embodied as a positive-temperature-coefficient (PTC) thermistor and having a resistance value in a range between 10 mΩ and 10 Ω, and a capacitor connected in parallel with the ohmic resistor and having a capacitance value of at least 1 nF, and
   at least one wheel axle connected to the rotor shaft directly or by way of a gear train assembly.

8. A rail-mounted car set, comprising:
   a sequence of rail vehicles coupled to one another,
   wherein at least the first and the last rail vehicle of the sequence of coupled rail vehicles comprises at least one electric machine comprising a base body, a stator arranged in the base body, a rotor shaft which is rotatably mounted in the base body by way of bearings, and a pick-up element mechanically connected to the base body and prevented from rotating relative to the base body, wherein the pick-up element taps a voltage occurring in the rotor shaft and is electrically connected to the base body by way of an ohmic resistor embodied as a positive-temperature-coefficient (PIC) thermistor and having a resistance value in a range between 10 mΩ and 10 Ω, and a capacitor connected in parallel with the ohmic resistor and having a capacitance value of at least 1 nF, and at least one wheel axle connected to the rotor shaft directly or by way of a gear train assembly.

\* \* \* \* \*

UNITED STATES PATENT AND TRADEMARK OFFICE
CERTIFICATE OF CORRECTION

PATENT NO. : 9,003,976 B2  
APPLICATION NO. : 13/996966  
DATED : April 14, 2015  
INVENTOR(S) : Martin Bauer and Carsten Probol Page 1 of 1

It is certified that error appears in the above-identified patent and that said Letters Patent is hereby corrected as shown below:

In the Claims

In column 6, Claim 8, line 39 correct "PIC thermistor" to read --PTC thermistor--.

Signed and Sealed this
Twenty-ninth Day of September, 2015

Michelle K. Lee
*Director of the United States Patent and Trademark Office*